(12) United States Patent
Seno

(10) Patent No.: US 10,972,317 B2
(45) Date of Patent: Apr. 6, 2021

(54) DEVICE AND METHOD FOR DATA RECEPTION

(71) Applicant: SYNAPTICS INCORPORATED, San Jose, CA (US)

(72) Inventor: Takefumi Seno, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 114 days.

(21) Appl. No.: 16/287,720

(22) Filed: Feb. 27, 2019

(65) Prior Publication Data

US 2019/0273638 A1 Sep. 5, 2019

(30) Foreign Application Priority Data

Mar. 2, 2018 (JP) .............................. JP2018-037738

(51) Int. Cl.
| | |
|---|---|
| *H04B 3/00* | (2006.01) |
| *H04L 25/02* | (2006.01) |
| *H04L 7/027* | (2006.01) |
| *H04L 7/033* | (2006.01) |

(52) U.S. Cl.
CPC ........ *H04L 25/0272* (2013.01); *H04L 7/0276* (2013.01); *H04L 7/0337* (2013.01); *H04L 25/0292* (2013.01)

(58) Field of Classification Search
CPC . H04L 25/0272; H04L 7/0276; H04L 7/0337; H04L 25/0292
USPC ................................ 375/257, 219, 316, 295
See application file for complete search history.

(56) References Cited

U.S. PATENT DOCUMENTS 10,469,214 B1 * 11/2019 Dudulwar ........ G01R 31/31709

* cited by examiner

*Primary Examiner* — Zewdu A Kassa
(74) *Attorney, Agent, or Firm* — Ferguson Braswell Fraser Kubasta PC

(57) ABSTRACT

A receiver device comprises one or more differential receivers configured to respectively output single ended signals, one or more delay compensation circuitries configured to delay the single ended signals, clock recovery circuitry configured to generate a recovered clock signal based on a compensated single ended signals respectively outputted from the delay compensation circuitries, and one or more latch circuitries configured to respectively latch the compensated single ended signals in synchronization with the recovered clock signal.

20 Claims, 13 Drawing Sheets

Fig. 6

| Previous Symbol | Current Symbol | Zero Crossing Timing |
|---|---|---|
| weak | weak | Mid |
| strong | strong | Mid |
| strong | weak | Slow |
| weak | strong | Fast |

Fig. 7

| Previous Symbol | Current Symbol | Selector Operation | Inserted Delay | Zero Crossing Timing |
|---|---|---|---|---|
| weak | weak | D1 | $D_A$ | Slow |
| strong | strong | D0 | 0 | Mid |
| strong | weak | D0 | 0 | Slow |
| weak | strong | D1 | $D_A$ | Mid |

| | | State #1 | State #2 | State #3 | State #4 | State #5 | State #6 |
|---|---|---|---|---|---|---|---|
| State of Each Wire | A | "H" | "H" | "M" | "M" | "L" | "L" |
| | B | "M" | "L" | "H" | "L" | "H" | "M" |
| | C | "L" | "M" | "L" | "H" | "M" | "H" |
| Logical Value of Differential Receiver Outputs | A-B | 1 | 1 | 0 | 1 | 0 | 0 |
| | B-C | 1 | 0 | 1 | 0 | 1 | 0 |
| | C-A | 0 | 0 | 0 | 1 | 1 | 1 |

: weak

Fig. 10

| Previous Symbol | Current Symbol | Selector Operation | Inserted Delay | Zero Crossing Timing |
|---|---|---|---|---|
| weak | weak | D1 | $D_A$ | Slow |
| strong | strong | D1 | $D_A$ | Slow |
| strong | weak | D0 | 0 | Slow |
| weak | strong | D2 | $D_A + D_B$ | Slow |

Fig. 12

| Previous Symbol | Current Symbol | Zero Crossing Timing | Delay of Differential Receiver |
|---|---|---|---|
| weak | weak | Mid | Large |
| strong | strong | Mid | Small |
| strong | weak | Slow | Large |
| weak | strong | Fast | Mid |

Fig. 13

| Previous Symbol | Current Symbol | Selector Operation | Inserted Delay | Zero Crossing Timing |
|---|---|---|---|---|
| weak | weak | D1 | $D_A$ | Slow |
| strong | strong | D2 | $D_A + D_B$ | Slow |
| strong | weak | D0 | 0 | Slow |
| weak | strong | D3 | $D_A + D_B + D_C$ | Slow |

DEVICE AND METHOD FOR DATA RECEPTION

CROSS REFERENCE

This application claims priority to Japanese Patent Application No. 2018-037738, filed on Mar. 2, 2018, the disclosure of which is incorporated herein by reference in its entirety.

BACKGROUND

Field

The present disclosure relates to a device and method for data reception.

Description of the Related Art

A lane used in a data communication system may comprise three or more wires to achieve high speed data communications. Examples of such a technology include the mobile industry processor interface (MIPI) C-PHY. A wide data valid window is desired to improve reliability in data communications, and accordingly a data communication system is designed to enlarge the data valid window.

SUMMARY

In one or more embodiments, a receiver device comprising a first differential receiver, a first delay compensation circuitry, clock recover circuitry, and a first latch circuitry is disclosed herein. The first differential receiver is configured to output a first single ended signal based on a voltage between a first wire and a second wire of the three or more wires. The first delay compensation circuitry is configured to generate a first compensated single ended signal by delaying the first single ended signal. The clock recovery circuitry is configured to generate a recovered clock signal at least partially based on the first compensated single ended signal. The first latch circuitry configured to latch the first compensated single ended signal in synchronization with the recovered clock signal. Further, a delay time of the first delay compensation circuitry used in reception of a first symbol is at least partially based on a voltage between the first wire and the second wire in reception of a second symbol transmitted before the first symbol.

In one or more embodiments, a receiver device comprises a first differential receiver configured to output a first single ended signal based on a voltage between a first wire and a second wire, a second differential receiver configured to output a second single ended signal based on a voltage between the second wire and a third wire, a third differential receiver configured to output a third single ended signal based on a voltage between the third wire and the first wire, and first state identification circuitry configured to generate a first state signal indicating a state of a voltage between the first wire and the second wire based on the second single ended signal and the third single ended signal.

In one or more embodiments, a data reception method comprises outputting a first single ended signal based on a voltage between a first wire and a second wire, generating a first compensated single ended signal, generating a recovered clock signal based on the first compensated single ended signal, and latching the first compensated single ended signal in synchronization with the recovered clock signal. Further, generating the first compensated single ended signal comprises controlling a delay time applied to the first single ended signal in generating the first compensated single ended signal in reception of a first symbol, based on a voltage between the first wire and the second wire in reception of a second symbol transmitted before the first symbol.

BRIEF DESCRIPTION OF THE DRAWINGS

So that the manner in which the above recited features of the present disclosure may be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIG. 6 illustrates a relationship between the states of the voltages $V_A$-$V_B$, $V_B$-$V_C$, and $V_C$-$V_A$ in reception of previous and current symbols and zero-crossing timing of the voltages $V_A$-$V_B$, $V_B$-$V_C$, and $V_C$-$V_A$, according to one or more embodiments.

FIG. 7 illustrates an example operation of delay compensation circuitry in the receiver device illustrated in FIG. 5, according to one or more embodiments.

FIG. 10 illustrates an example operation of delay compensation circuitry in the receiver device illustrated in FIG. 9, according to one or more embodiments.

FIG. 12 illustrates a relationship among the states of the voltages $V_A$-$V_B$, $V_B$-$V_C$, and $V_C$-$V_A$ in reception of previous and current symbols, zero-crossing timing of the voltages $V_A$-$V_B$, $V_B$-$V_C$, and $V_C$-$V_A$, and delays in differential receivers, according to one or more embodiments.

FIG. 13 illustrates an example operation of delay compensation circuitry in the receiver device illustrated in FIG. 11, according to one or more embodiments.

DETAILED DESCRIPTION

Figure 1:
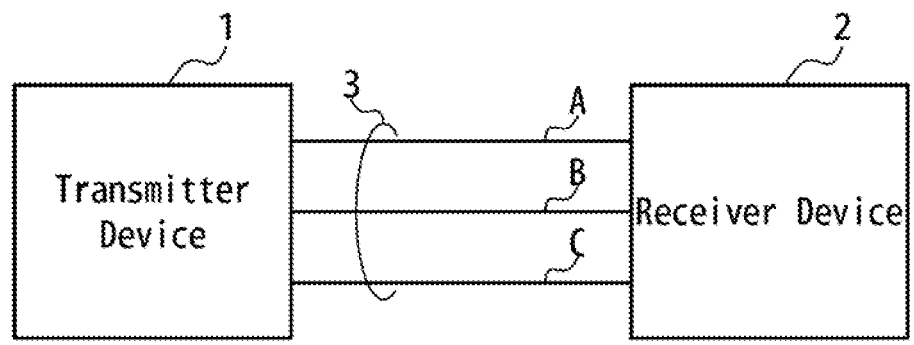
FIG. 1 illustrates an example configuration of a data communication system, according to one or more embodiments.

In one or more embodiments, as illustrated in FIG. 1, a data communication system comprises a transmitter device 1 and a receiver device 2. In one or more embodiments, the data communication system supports the mobile industry processor interface (MIPI) C-PHY standard, but not limited to this. In one or more embodiments, the transmitter device 1 is connected to the receiver device 2 via a lane 3. In one or more embodiments, the transmitter device 1 and the receiver device 2 are integrated in separate semiconductor chips.

In one or more embodiments, the lane 3 comprises three wires A, B, and C. In one or more embodiments, each of the wires A, B, and C is allowed to take three potentials. In the following, these three potentials may be referred to as "H", "M", and "L", respectively. In one or more embodiments, in each unit interval (UI) in which a data is transmitted, one of the wires A, B, and C is set to the "H" level, another is set to the "M" level, and the other is set to the "L" level. In such an embodiment, the total number of allowed combinations of the potentials on the wires A, B, and C is six. A symbol transmitted in each UI is represented by a combination of the potentials on the wires A, B, and C, in one or more embodiments. In the following, the potentials on the wires A, B, and C may be denoted as $V_A$, $V_B$, and $V_C$, respectively.

Figure 2:
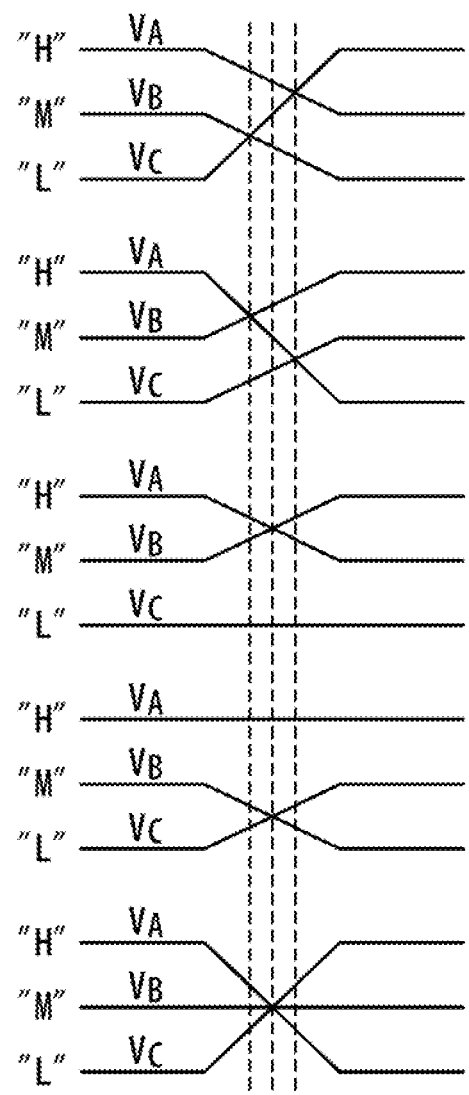
FIG. 2 illustrates possible transitions in the potentials $V_A$, $V_B$, and $V_C$ on the wires A, B, and C, according to one or more embodiments.
Figure 3:
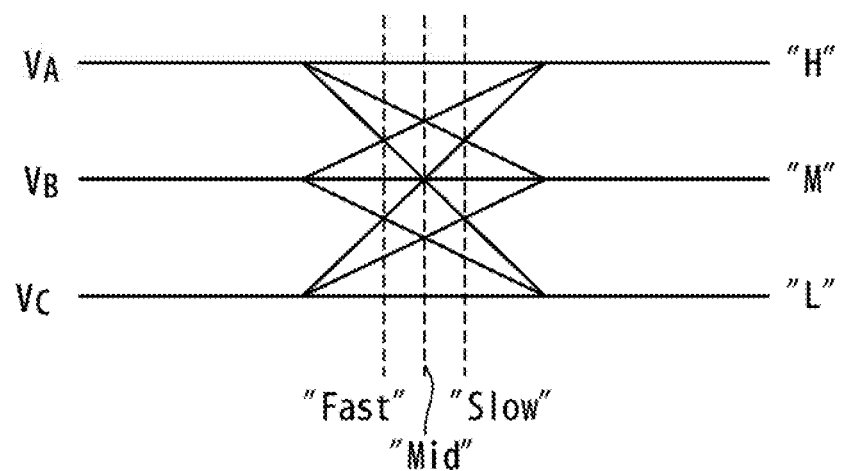
FIG. 3 illustrates superposed illustrations of possible transitions in potentials $V_A$, $V_B$, and $V_C$ on the wires A, B, and C, according to one or more embodiments.

In one or more embodiments, as illustrated in FIG. 2, when a next symbol is transmitted after a specific symbol is transmitted, the potentials $V_A$, $V_B$, and $V_C$ on the wires A, B, and C are switched to a potential combination different from a potential combination in transmitting the specific symbol. Illustrated in FIG. 3 are superposed illustrations of all the combinations of allowed transitions in the potentials $V_A$, $V_B$, and $V_C$ on the wires A, B, and C in transmitting a next symbol, for the case when the potentials $V_A$, $V_B$, and $V_C$ on the wires A, B, and C are the "H", "M", and "L" levels, respectively, in transmitting the specific symbol.

In data communications in accordance with the MIPI C-PHY standard, in one or more embodiments, three single ended signals are generated by three differential receivers based on the voltage or potential difference $V_A-V_B$ between the wires A and B, the voltage $V_B-V_C$ between the wires B and C, and the voltage $V_C-V_A$ between the wires C and A, and data are received by latching the three single ended signals. In one or more embodiments, the three single ended signals are latched in synchronization with a recovered clock signal recovered from the three single ended signals.

Figure 4:
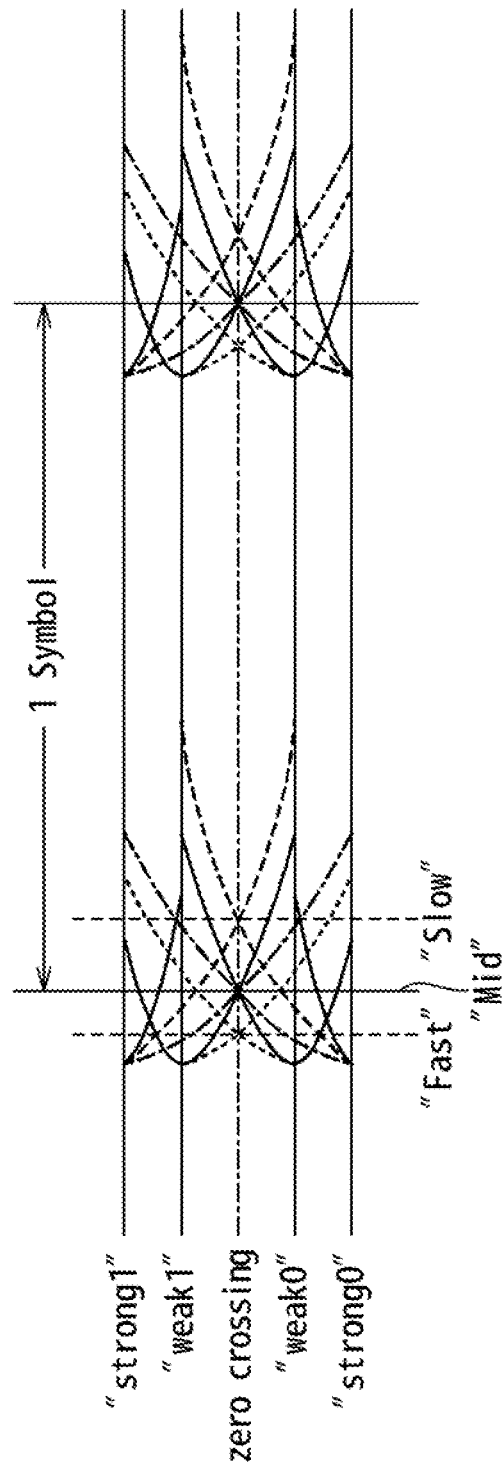
FIG. 4 illustrates possible transitions in voltages $V_A$-$V_B$, $V_B$-$V_C$, and $V_C$-$V_A$, according to one or more embodiments.

Referring to FIG. 4, which illustrates possible transitions in the voltages $V_A-V_B$, $V_B-V_C$, and $V_C-V_A$, the voltages $V_A-V_B$, $V_B-V_C$, and $V_C-V_A$ are each allowed to take four states "strong 1", "weak 1", "weak 0", and "strong 0," in one or more embodiments. In one or more embodiments, "strong 1" and "weak 1" correspond to a logical value "1", while "weak 0" and "strong 0" correspond to a logical value "0."

In one or more embodiments, "strong 1" corresponds to a state in which the voltage $V_A-V_B$, $V_B-V_C$, or $V_C-V_A$ is a positive voltage having a relatively large absolute value. When the potentials $V_A$ and $V_B$ are the "H" and "L" levels, respectively, for example, the voltage $V_A-V_B$ is in the "strong 1" state, in one or more embodiments.

In one or more embodiments, "weak 1" corresponds to a state in which the voltage $V_A-V_B$, $V_B-V_C$, or $V_C-V_A$ is a positive voltage having a relatively small absolute value. In various embodiments, when the potentials $V_A$ and $V_B$ are the "H" and "M" levels, respectively, or the "M" and "L" levels, respectively, for example, the voltage $V_A-V_B$ is in the "weak 1" state.

In one or more embodiments, "weak 0" corresponds to a state in which the voltage $V_A-V_B$, $V_B-V_C$, or $V_C-V_A$ is a negative voltage having a relatively small absolute value. In various embodiments, when the potentials $V_A$ and $V_B$ are the "M" and "H" levels, respectively, or the "L" and "M" levels, respectively, for example, the voltage $V_A-V_B$ is in the "weak 0" state.

In one or more embodiments, "strong 0" corresponds to a state in which the voltage $V_A-V_B$, $V_B-V_C$, or $V_C-V_A$ is a negative voltage having a relatively large absolute value. In various embodiments, when the potentials $V_A$ and $V_B$ are the "L" and "H" levels, respectively, for example, the voltage $V_A-V_B$ is in the "strong 0" state.

In the following, the two states "weak 0" and "weak 1", in which the absolute values of the relevant voltages are relatively small, may be collectively referred to as the "weak" state, and the other two states "strong 0" and "strong 1", in which the absolute values of the relevant voltages are relatively large, may be collectively referred to as the "strong" state.

In one or more embodiments, the voltages $V_A-V_B$, $V_B-V_C$, and $V_C-V_A$ are switched among "strong 1", "weak 1", "weak 0", and "strong 0" when a symbol is transmitted. In various embodiments, when a logical value is switched between "1" and "0", zero crossing occurs in at least one of the voltages $V_A-V_B$, $V_B-V_C$, and $V_C-V_A$, in one or more embodiments. The timing at which zero crossing occurs may be referred to as zero crossing timing. In one or more embodiments, the above-described recovered clock signal is generated in synchronization with zero crossing timing of the voltages $V_A-V_B$, $V_B-V_C$, and $V_C-V_A$.

In communications in accordance with the MIPI C-PHY standard, zero crossing timing of the voltages $V_A-V_B$, $V_B-V_C$, and $V_C-V_A$ is dispersed into three types of timing in one or more embodiments. In one or more embodiments, zero crossing timing is the earliest in a transition from "weak 1" to "strong 0" and a transition from "weak 0" to "strong 1." This zero crossing timing may be referred to as "Fast", hereinafter. In one or more embodiments, zero crossing timing is the latest in a transition from "strong 1" to "weak 0" and a transition from "weak 1" to "strong 0." This zero crossing timing may be referred to as "Slow", hereinafter. In one or more embodiments, zero crossing timing is medium in a transition between "weak 0" and "weak 1" and a transition between "strong 0" and "strong 1." This zero crossing timing may be referred to as "Mid", hereinafter.

In one or more embodiments, the receiver device 2 is configured to suppress reduction in a data valid window potentially caused by a dispersion in generation timing of clock pulses in a recovered clock signal which may be caused by a dispersion in the zero crossing timing.

Figure 5:
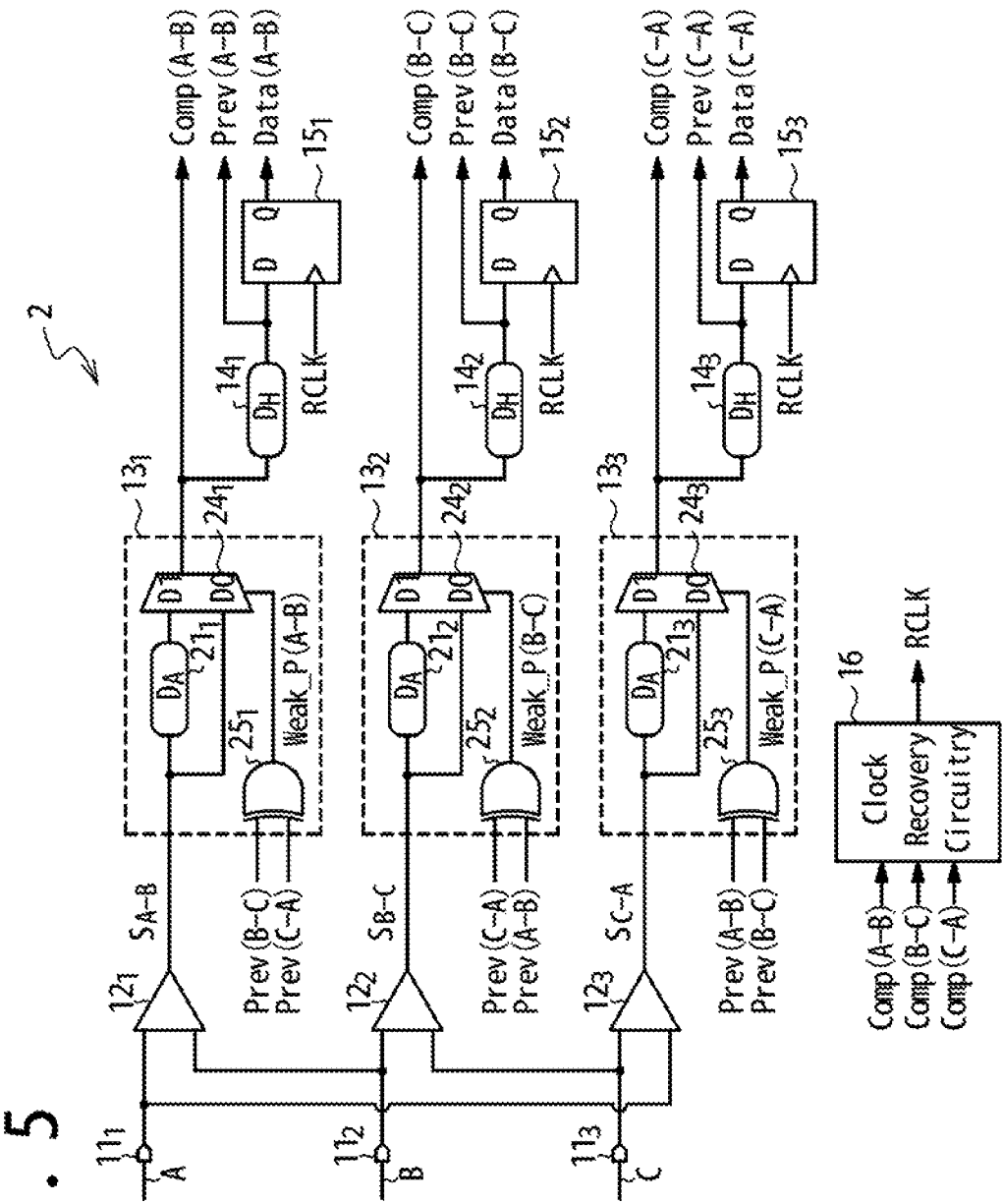
FIG. 5 is illustrates an example configuration of a receiver device, according to one or more embodiments.

In one or more embodiments, as illustrated in FIG. 5, the receiver device 2 comprises input terminals $11_1$ to $11_3$, differential receivers $12_1$ to $12_3$, delay compensation circuitries $13_1$ to $13_3$, hold delay circuitries $14_1$ to $14_3$, latches $15_1$ to $15_3$, and clock recovery circuitry 16.

In one or more embodiments, the input terminals $11_1$ to $11_3$ are connected to the wires A, B, and C, respectively, to receive signals transmitted over the wires A, B, and C from the transmitter device 1.

In one or more embodiments, the differential receivers $12_1$ to $12_3$ are configured to generate single ended signals $S_{A-B}$, $S_{B-C}$, and $S_{C-A}$ which correspond to the voltages $V_A-V_B$, $V_B-V_C$, and $V_C-V_A$, respectively. In one or more embodiments, the differential receiver $12_1$ comprises a first input connected to the wire A and a second input connected to the wire B, and is configured to output the single ended signal $S_{A-B}$ of a logical value corresponding to the voltage $V_A-V_B$. In one or more embodiments, the differential receiver $12_2$ comprises a first input connected to the wire B and a second input connected to the wire C, and is configured to output the single ended signal $S_{B-C}$ of a logical value corresponding to the voltage $V_B-V_C$. In one or more embodiments, the differential receiver $12_3$ comprises a first input connected to the wire C and a second input connected to the wire A, and is configured to output the single ended signal $S_{C-A}$ of a logical value corresponding to the voltage $V_C-V_A$. In one or more embodiments, the single ended signal $S_{A-B}$ takes the logical value "1", when the voltage $V_A-V_B$ between the wires A and B is "strong 1" or "weak 1", and takes the logical value "0", when "strong 1" or "weak 1". In one or more embodiments, the same applies to the single ended signals $S_{B-C}$, and $S_{C-A}$.

In one or more embodiments, the delay compensation circuitries $13_1$ to $13_3$ are configured to give appropriate delays to the single ended signals $S_{A-B}$, $S_{B-C}$, and $S_{C-A}$ to compensate the dispersion in the above-described zero crossing timing. In one or more embodiments, the delay compensation circuitry $13_1$ comprises delay circuitry $21_1$, a selector $24_1$, and an XOR circuit $25_1$. In one or more embodiments, the delay circuitry $21_1$ is configured to delay the single ended signal $S_{A-B}$ by a delay time $D_A$. In one or more embodiments, the selector $24_1$ comprises an input D0 connected to an output of the differential receiver $12_1$ and an input D1 connected an output of the delay circuitry $21_1$. In one or more embodiments, the selector $24_1$ is configured to select one of the single ended signal $S_{A-B}$ received from the differential receiver $12_1$ and an output signal of the delay circuitry $21_1$, based on an output signal of the XOR circuit $25_1$ and output the selected signal.

In one or more embodiments, the delay compensation circuitries $13_2$ and $13_3$ are similarly configured. In one or more embodiments, the delay compensation circuitry $13_2$ comprises delay circuitry $21_2$, a selector $24_2$, and an XOR circuit $25_2$, and the delay compensation circuitry $13_3$ comprises delay circuitry $21_3$, a selector $24_3$, and an XOR circuit $25_3$. In one or more embodiments, the delay time of the delay circuitries $21_2$ and $21_3$ is $D_A$. Details of the operations of the delay compensation circuitries $13_1$ to $13_3$ will be described later. The single ended signals outputted from the delay compensation circuitries $13_1$ to $13_3$ may be hereinafter referred to as compensated single ended signals Comp(A-B), Comp(B-C), and Comp(C-A), respectively.

In one or more embodiments, the hold delay circuitries $14_1$ to $14_3$ are configured to give appropriate delays to the compensated single ended signals Comp(A-B), Comp(B-C), and Comp(C-A) to provide sufficient hold times for the latches $15_1$ to $15_3$. In one or more embodiments, the single ended signals outputted from the hold delay circuitries $14_1$ to $14_3$ represent logical values corresponding to a previous symbol transmitted before a symbol transmitted by the signals which are being currently inputted to the differential receivers $12_1$ to $12_3$ from the wires A, B, and C. The single ended signals outputted from the hold delay circuitries $14_1$ to $14_3$ may be hereinafter referred to as previous symbol single ended signals Prev(A-B), Prev(B-C), and Prev(C-A), respectively.

In one or more embodiments, the latches $15_1$ to $15_3$ are configured to latch logical values of the previous symbol single ended signals Prev(A-B), Prev(B-C), and Prev(C-A) in synchronization with a recovered clock signal RCLK supplied from the clock recovery circuitry 16 and output latch data signals Data(A-B), Data(B-C), and Data(C-A) which have the latched logical values.

In one or more embodiments, the clock recovery circuitry 16 is configured to perform clock recovery on the compensated single ended signals Comp(A-B), Comp(B-C), and Comp(C-A) received from the delay compensation circuitries $13_1$ to $13_3$ to generate a recovered clock signal RCLK. In one or more embodiments, the recovered clock signal RCLK thus generated is supplied to the latches $15_1$ to $15_3$.

In one or more embodiments, the clock recovery circuitry 16 may be configured to output a clock pulse in the clock recovery signal RCLK in synchronization with the earliest one of inversions of the compensated single ended signals Comp(A-B), Comp(B-C), and Comp(C-A).

In one or more embodiments, to compensate the dispersion in the zero crossing timing, the delay times of the delay compensation circuitries $13_1$ to $13_3$ used for reception of each symbol are controlled based on the voltages $V_A-V_B$, $V_B-V_C$, and $V_C-V_A$ in reception of a previous symbol transmitted just before each symbol is transmitted. In one or more embodiments, the delay time of the delay compensation circuitry $13_1$ used for reception of a certain symbol is controlled based on whether the voltage $V_A-V_B$ in reception of a previous symbol transmitted before the certain symbol is "weak" or "strong." In one or more embodiments, the delay time of the delay compensation circuitry $13_2$ used for reception of a certain symbol is controlled based on whether the voltage $V_B-V_C$ in reception of a previous symbol transmitted before the certain symbol is "weak" or "strong", and the delay time of the delay compensation circuitry $13_3$ used for reception of a certain symbol is controlled based on whether the voltage $V_B-V_C$ in reception of a previous symbol transmitted before the certain symbol is "weak" or "strong."

As is understood from the table illustrated in FIG. 6, in one or more embodiments, zero crossing timing of the voltages $V_A-V_B$, $V_B-V_C$, and $V_C-V_A$ depends on whether each of the voltages $V_A-V_B$, $V_B-V_C$, and $V_C-V_A$ in reception of the previous and current symbols is "weak" or "strong." As for the voltage $V_A-V_B$, the zero crossing timing of the voltage $V_A-V_B$ is "Mid" when the voltages $V_A-V_B$ in the reception of the previous symbol and the reception of the current symbol are both "weak" or are both "strong", in one or more embodiments. The zero crossing timing of the voltage $V_A-V_B$ is "Slow" when the voltage $V_A-V_B$ in the reception of the previous symbol is "strong" and that in reception of the current symbol is "weak", in one or more embodiments. The zero crossing timing of the voltage $V_A-V_B$ is "Fast" when the voltage $V_A-V_B$ in the reception of the previous symbol is "weak" and the voltage $V_A-V_B$ in the reception of the current symbol is "strong", in one or more embodiments. In one or more embodiments, the same goes for the voltages $V_B-V_C$ and $V_C-V_A$.

In one or more embodiments, the delay times of the delay compensation circuitries $13_1$ to $13_3$ are controlled depending on whether the voltages $V_A-V_B$, $V_B-V_C$, and $V_C-V_A$ in the reception of the previous symbol are "weak" or "strong."

In one or more embodiments, as illustrated in FIG. 7, when the voltage $V_A-V_B$ is "weak" in the reception of the previous symbol, the delay compensation circuitry $13_1$ outputs a signal obtained by delaying the single ended signal $S_{A-B}$ by the delay time $D_A$ as the compensated single ended signal Comp(A-B). This operation is achieved by selecting the output signal of the delay circuitry $21_1$ by the selector $24_1$ of the delay compensation circuitry $13_1$, in one or more embodiments. When the voltage $V_A-V_B$ is "strong" in the reception of the previous symbol, the delay compensation circuitry $13_1$ outputs the single ended signal $S_{A-B}$ received from the differential receiver $12_1$ as the compensated single ended signal Comp(A-B) without a delay, in one or more embodiments.

This operation generates the compensated single ended signal Comp(A-B), while compensating the dispersion of the zero crossing timing of the voltage $V_A-V_B$. For example, when the time difference between the timing "Fast" and the timing "Mid" is the same as that between the timing "Mid"

and the timing "Slow", setting the delay time $D_A$ of the delay circuitry $21_1$ to the time difference makes it possible to generate the compensated single ended signal Comp(A–B) so that there are only two types of effective zero crossing timing "Mid" and "Slow" with respect to the voltage $V_A$–$V_B$. Even if the time difference between the timing "Fast" and the timing "Mid" is not the same as that between the timing "Mid" and the timing "Slow", in one or more embodiments, the dispersion in the zero crossing timing of the voltage $V_A$–$V_B$ can be compensated by setting the delay time $D_A$ to an appropriate value. For example, the delay time $D_A$ may be set to the average of the time difference between the timing "Fast" and the timing "Mid" and the time difference between the timing "Mid" and the timing "Slow."

In one or more embodiments, the delay times of the delay compensation circuitries $13_2$ and $13_3$ are controlled in a similar way. In one or more embodiments, when the voltage $V_B$–$V_C$ is "weak" in the reception of the previous symbol, the delay compensation circuitry $13_2$ outputs a signal obtained by delaying the single ended signal $S_{B-C}$ by the delay time $D_A$ as the compensated single ended signal Comp(B–C). In various embodiments, when the voltage $V_B$–$V_C$ is "strong" in the reception of the previous symbol, the delay compensation circuitry $13_2$ outputs the single ended signal $S_{B-C}$ received from the differential receiver $12_2$ as the compensated single ended signal Comp(B–C) without a delay. Further, in one or more embodiments, when the voltage $V_C$–$V_A$ is "weak" in the reception of the previous symbol, the delay compensation circuitry $13_3$ outputs a signal obtained by delaying the single ended signal $S_{C-A}$ by the delay time $D_A$ as the compensated single ended signal Comp(C–A). When the voltage $V_C$–$V_A$ is "strong" in the reception of the previous symbol, the delay compensation circuitry $13_3$ outputs the single ended signal $S_{C-A}$ received from the differential receiver $12_3$ as the compensated single ended signal Comp(C–A) without a delay, in one or more embodiments. The operation described above generates the compensated single ended signals Comp(B–C) and Comp (C–A), while compensating the dispersion of the zero crossing timing.

In one or more embodiments, a logic operation is performed on the previous symbol single ended signals Prev (A–B), Prev(B–C), and Prev(C–A) to identify whether each of the voltages $V_A$–$V_B$, $V_B$–$V_C$, and $V_C$–$V_A$ in the reception of the previous symbol is "weak" or "strong", not directly detecting the voltages $V_A$–$V_B$, $V_B$–$V_C$, and $V_C$–$V_A$. In the following, a description is given of the identification of the states of the voltages $V_A$–$V_B$, $V_B$–$V_C$, and $V_C$–$V_A$ through the logic operation.

Figure 8:
FIG. 8 illustrates a relationship between logical values of single ended signals outputted from differential receivers and states of the voltages $V_A$-$V_B$, $V_B$-$V_C$, and $V_C$-$V_A$, according to one or more embodiments.

With reference to FIG. 8, in one or more embodiments, the number of the allowed states of the wires A, B, and C is six, since the wires A, B, and C take different potentials selected from "H", "M", and "L." These six states may be hereinafter referred to as states #1 to #6, respectively. For example, state #1 may be a state in which the potentials of the wires A, B, and C are "H", "M", and "L", respectively.

In one or more embodiments, it is identified whether the voltage $V_A$–$V_B$ in reception of a certain symbol is "weak" or "strong", based on the logical values of the single ended signals $S_{B-C}$ and $S_{C-A}$ outputted from the differential receivers $12_2$ and $12_3$ in the reception of the certain symbol. In one or more embodiments, one of the wires A and B takes the potential "M" when the voltage $V_A$–$V_B$ is "weak." In one or more embodiments, one of the logical values of the single ended signals $S_{B-C}$ and $S_{C-A}$ is "1" and the other is "0" when one of the wires A and B takes the potential "M", since the single ended signals $S_{B-C}$ corresponds to the voltage $V_B$–$V_C$ between the wires B and C. For example, when the wire A takes the potential "M", the wires A, B, and C are placed in state #3 or state #4, in one or more embodiments. The single ended signals $S_{B-C}$ and $S_{C-A}$ are respectively "1" and "0" in state #3 and "0" and "1" in state #4. In one or more embodiments, the voltage $V_A$–$V_B$ is identified as being "weak", when the exclusive OR of the logical values of the single ended signals $S_{B-C}$ and $S_{C-A}$ is "1."

In one or more embodiments, it is identified whether the voltage $V_B$–$V_C$ in reception of a certain symbol is "weak" or "strong", based on the logical values of the single ended signals $S_{C-A}$ and $S_{A-B}$ outputted from the differential receivers $12_3$ and $12_1$ in the reception of the certain symbol. In one or more embodiments, the voltage $V_B$–$V_C$ is identified as being "weak", when the exclusive OR of the logical values of the single ended signals $S_{C-A}$ and $S_{A-B}$ is "1."

In one or more embodiments, it is identified whether the voltage $V_C$–$V_A$ in reception of a certain symbol is "weak" or "strong", based on the logical values of the single ended signals $S_{A-B}$ and $S_{B-C}$ outputted from the differential receivers $12_1$ and $12_2$ in the reception of the certain symbol. In one or more embodiments, the voltage $V_C$–$V_A$ is identified as being "weak", when the exclusive OR of the logical values of the single ended signals $S_{A-B}$ and $S_{C-A}$ is "1."

In one or more embodiments, it is identified whether each of the voltages $V_A$–$V_B$, $V_B$–$V_C$, and $V_C$–$V_A$ is "weak" or "strong" in the reception of the previous symbol through a logic operation of the previous symbol single ended signals Prev(A–B), Prev(B–C), and Prev(C–A). In one or more embodiments, as illustrated in FIG. 5, the delay compensation circuitries $13_1$, $13_2$, and $13_3$ are configured to identify whether each of the voltages $V_A$–$V_B$, $V_B$–$V_C$, and $V_C$–$V_A$ is "weak" or "strong" in the reception of the previous symbol based on the previous symbol single ended signals Prev(A–B), Prev(B–C), and Prev(C–A), to control the delay times of the delay compensation circuitries $13_1$, $13_2$, and $13_3$.

In one or more embodiments, the delay time of the delay compensation circuitry $13_1$ is controlled based on the previous symbol single ended signals Prev(A–B) and Prev(B–C). In one or more embodiments, the XOR circuit $25_1$ of the delay compensation circuitry $13_1$ operates as state identification circuitry configured to generate a previous symbol state signal Weak_P(A–B) based on the previous symbol single ended signals Prev(A–B) and Prev(B–C). In one or more embodiments, the previous symbol state signal Weak_P(A–B) indicates the state of the voltage $V_A$–$V_B$, more specifically, whether the voltage $V_A$–$V_B$ is "weak" or "strong." In one or more embodiments, the previous symbol state signal Weak_P(A–B) has a logical value equal to the exclusive OR of the previous symbol single ended signals Prev(B–C) and Prev(C–A). The previous symbol state signal Weak_P(A–B) takes the logical value "1", when the voltage $V_A$–$V_B$ is "weak" in the reception of the previous symbol.

In one or more embodiments, the selector $24_1$ selects the input D1 and outputs the output signal of the delay circuitry $21_1$ as the compensated single ended signal Comp(A–B), when the previous symbol state signal Weak_P(A–B) is "1." In one or more embodiments, the selector $24_1$ selects the input D0 and outputs the single ended signal $S_{A-B}$ received from the differential receiver $12_1$ as the compensated single ended signal Comp(A–B), when the previous symbol state signal Weak_P(A–B) is "0." In one or more embodiments, as a result of these operations, a delay of the delay time $D_A$ is applied to the single ended signal $S_{A-B}$ when the voltage $V_A$–$V_B$ is "weak" for the previous symbol, as illustrated in FIG. 7.

In one or more embodiments, the delay time of the delay compensation circuitry $13_2$ is controlled based on the previous symbol single ended signals Prev(C–A) and Prev(A–B). In one or more embodiments, the XOR circuit $25_2$ of the delay compensation circuitry $13_2$ operates as state identification circuitry configured to generate a previous symbol state signal Weak_P(B–C) based on the previous symbol single ended signals Prev(C–A) and Prev(A–B). In one or more embodiments, the previous symbol state signal Weak_P(B–C) has a logical value equal to the exclusive OR of the previous symbol single ended signals Prev(C–A) and Prev(A–B); the previous symbol state signal Weak_P(B–C) takes the logical value "1", when the voltage $V_B-V_C$ is "weak" in the reception of the previous symbol. In one or more embodiments, the selector $24_2$ outputs the output signal of the delay circuitry $21_2$ as the compensated single ended signal Comp(B–C), when the previous symbol state signal Weak_P(B–C) is "1" and outputs the single ended signal $S_{B-C}$ as the compensated single ended signal Comp(B–C), when the previous symbol state signal Weak_P(B–C) is "0." This gives a delay of the delay time $D_A$ to the single ended signal $S_{B-C}$ when the voltage $V_B-V_C$ is "weak" for the previous symbol.

In one or more embodiments, the delay time of the delay compensation circuitry $13_3$ is controlled based on the previous symbol single ended signals Prev(A–B) and Prev(B–C). In one or more embodiments, the XOR circuit $25_3$ of the delay compensation circuitry $13_3$ operates as state identification circuitry configured to generate a previous symbol state signal Weak_P(C–A) based on the previous symbol single ended signals Prev(A–B) and Prev(B–C). In one or more embodiments, the previous symbol state signal Weak_P(C–A) has a logical value equal to the exclusive OR of the previous symbol single ended signals Prev(A–B) and Prev(B–C). The previous symbol state signal Weak_P(B–C) takes the logical value "1", when the voltage $V_C-V_A$ is "weak" in the reception of the previous symbol. In one or more embodiments, the selector $24_3$ outputs the output signal of the delay circuitry $21_3$ as the compensated single ended signal Comp(C–A), when the previous symbol state signal Weak_P(C–A) is "1" and outputs the single ended signal $S_{C-A}$ as the compensated single ended signal Comp(C–A), when the previous symbol state signal Weak_P(C–A) is "0." This gives a delay of the delay time $D_A$ to the single ended signal $S_{C-A}$ when the voltage $V_C-V_A$ is "weak" for the previous symbol.

In one or more embodiments, the compensated single ended signals Comp(A–B), Comp(B–C), and Comp(C–A) are supplied to the clock recovery circuitry 16 from the delay compensation circuitries $13_1$, $13_2$, and $13_3$, and used to generate the recovered clock signal RCLK. In one or more embodiments, the timing at which a clock pulse of the recovered clock signal RCLK is outputted in reception of each symbol is synchronous with the earliest one of inversions of the compensated single ended signals Comp(A–B), Comp(B–C), and Comp(C–A). This operation effectively compensates the dispersion in the zero crossing timing of the voltages $V_A-V_B$, $V_B-V_C$, and $V_C-V_A$ in the generation of the recovered clock signal RCLK supplied to the latches $15_1$ to $15_3$.

As described above, in one or more embodiments, it is identified whether each of the voltages $V_A-V_B$, $V_B-V_C$, $V_C-V_A$ is "weak" or "strong", and the delay times of the delay compensation circuitries $13_1$, $13_2$, and $13_3$ are controlled based on the identification result. This achieves compensation of the dispersion in the zero crossing timing in the generation of the compensated single ended signals Comp(A–B), Comp(B–C), and Comp(C–A). In one or more embodiments, the receiver device 2 effectively enlarges the data valid window by generating the recovered clock signal RCLK based on the single ended signals Comp(A–B), Comp(B–C), and Comp(C–A) thus generated.

Figure 9:
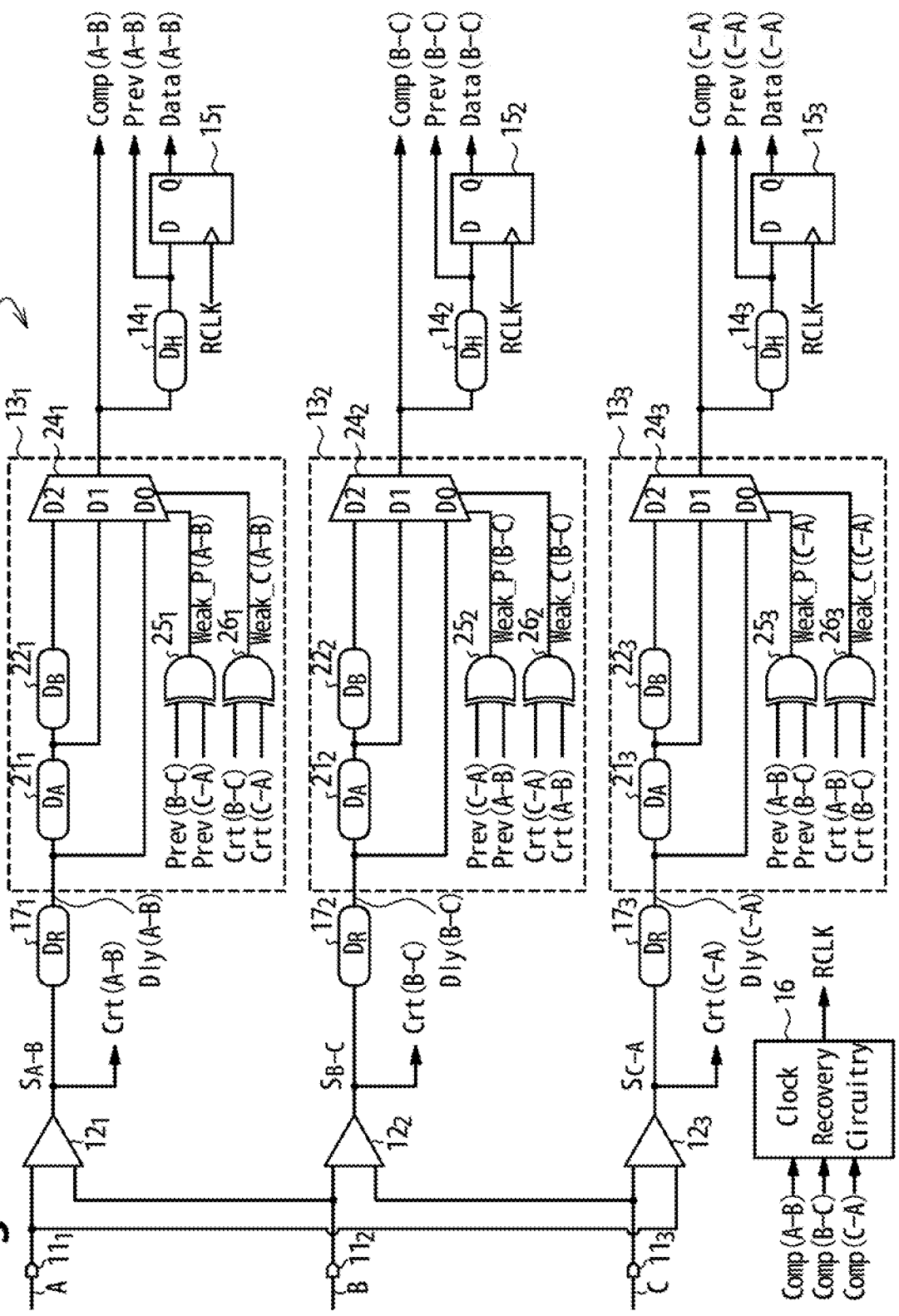
FIG. 9 illustrates an example configuration of a receiver device, according to one or more embodiments.

In one or more embodiments, as illustrated in FIG. 9, the receiver device 2 is configured to control the delay times of the delay compensation circuitries $13_1$, $13_2$, and $13_3$, based on the states of the voltages $V_A-V_B$, $V_B-V_C$, and $V_C-V_A$ in the reception of the current symbol as well as the states of the voltages $V_A-V_B$, $V_B-V_C$, and $V_C-V_A$ in the reception of the previous symbol. In one or more embodiments, the receiver device 2 additionally comprises delay circuitries $17_1$, $17_2$, and $17_3$, and the configurations of the delay compensation circuitries $13_1$, $13_2$, and $13_3$ are modified. In one or more embodiments, the rest is configured similarly to the receiver device 2 illustrated in FIG. 5.

In one or more embodiments, the delay circuitries $17_1$, $17_2$, and $17_3$ are configured to generate delayed single ended signals Dly(A–B), Dly(B–C), and Dly(C–A) by delaying the single ended signals $S_{A-B}$, $S_{B-C}$, and $S_{C-A}$ received from the differential receivers $12_1$, $12_2$, and $12_3$, respectively, and supply the delayed single ended signals Dly(A–B), Dly(B–C), and Dly(C–A) to the delay compensation circuitries $13_1$, $13_2$, and $13_3$, respectively. The delay circuitries $17_1$, $17_2$, and $17_3$ are used to make time to control the delay times of the delay compensation circuitries $13_1$, $13_2$, and $13_3$ based on the voltages $V_A-V_B$, $V_B-V_C$, and $V_C-V_A$ for the current symbol. In the following, to clarify that the single ended signals outputted from the differential receivers $12_1$, $12_2$, and $12_3$ have logical values corresponding to the voltages $V_A-V_B$, $V_B-V_C$, and $V_C-V_A$ for the current symbol, the single ended signals $S_{A-B}$, $S_{B-C}$, and $S_{C-A}$ outputted from the differential receivers $12_1$, $12_2$, and $12_3$ may be hereinafter referred to as the current symbol single ended signals Crt(A–B), Crt(B–C), and Crt(C–A).

In one or more embodiments, the delay compensation circuitries $13_1$, $13_2$, and $13_3$ are configured to control the delay times thereof based on the current symbol single ended signals Crt(A–B), Crt(B–C), and Crt(C–A) as well as the previous symbol single ended signals Prev(A–B), Prev(B–C), and Prev (C–A).

In one or more embodiments, the delay compensation circuitry $13_1$ comprises delay circuitries $21_1$, $22_1$, a selector $24_1$, and XOR circuits $25_1$ and $26_1$. In one or more embodiments, the delay circuitries $21_1$ and $22_1$ have delay times $D_A$ and $D_B$, respectively. In one or more embodiments, the delay circuitry $21_1$ is connected to an output of the delay circuitry $17_1$, and the delay circuitry $22_1$ is connected to an output of the delay circuitry $21_1$. In one or more embodiments, the selector $24_1$ comprises three inputs D0, D1, and D2. In one or more embodiments, the input D0 of the selector $24_1$ is connected to the output of the delay circuitry $17_1$, the input D1 is connected to the output of the delay circuitry $21_1$, and the input D2 is connected to the output of the delay circuitry $22_1$. In one or more embodiments, the delay compensation circuitry $13_1$ thus configured gives a selected one of delay times 0, $D_A$, and $D_A+D_B$ to the delayed single ended signal Dly(A–B) outputted from the delay circuitry $17_1$.

In one or more embodiments, the XOR circuit $25_1$ operates as state identification circuitry configured to generate a previous symbol state signal Weak_P(A–B) based on the previous symbol single ended signals Prev(B–C) and Prev (C–A), and the XOR circuit $26_1$ operates as state identification circuitry configured to generate a current symbol state signal Weak_C(A–B) based on the current symbol single ended signals Crt(B–C) and Crt (C–A). In one or more embodiments, the previous symbol state signal Weak_P(A–B) is generated to have a logical value equal to the exclusive OR of the previous symbol single ended signals Prev(B–C) and Prev(C–A). As is understood from the above-described discussion, this results in that the previous symbol state signal Weak_P(A–B) is set to "1" when the voltage $V_A-V_B$ is "weak" in the reception of the previous symbol. In one or more embodiments, the current symbol state signal Weak_C (A–B) is generated to have a logical value equal to the exclusive OR of the current symbol single ended signals Crt(B–C) and Crt (C–A). This results in that the current symbol state signal Weak_C(A–B) is set to "1" when the voltage $V_A-V_B$ is "weak" in the reception of the current symbol.

In one or more embodiments, the selector $24_1$ is configured to select one of the inputs D0, D1, and D2 based on the previous symbol state signal Weak_P(A–B) and the current symbol state signal Weak_C(A–B), which are outputted from the XOR circuits $25_1$ and $26_1$, respectively, and output the single ended signal inputted to the selected input as the compensated single ended signal Comp(A–B).

In one or more embodiments, the delay compensation circuitry $13_2$ is configured to operate similarly. In one or more embodiments, the delay compensation circuitry $13_2$ comprises delay circuitries $21_2$, $22_2$, a selector $24_2$, and XOR circuits $25_2$ and $26_2$. In one or more embodiments, the delay circuitries $21_2$ and $22_2$ have delay times $D_A$ and $D_B$, respectively. In one or more embodiments, the XOR circuit $25_2$ is configured to generate a previous symbol state signal Weak_P(B–C) which has a logical value equal to the exclusive OR of the previous symbol single ended signals Prev(C–A) and Prev(A–B). In one or more embodiments, the XOR circuit $26_2$ is configured to generate a current symbol state signal Weak_C(B–C) which has a logical value equal to the exclusive OR of the current symbol single ended signals Crt(C–A) and Crt (A–B). In one or more embodiments, the selector $24_2$ is configured to select one of the inputs D0, D1, and D2 based on the previous symbol state signal Weak_P(B–C) and the current symbol state signal Weak_C(B–C) and output the single ended signal inputted to the selected input as the compensated single ended signal Comp(B–C).

In one or more embodiments, the delay compensation circuitry $13_3$ is configured to operate similarly. In one or more embodiments, the delay compensation circuitry $13_3$ comprises delay circuitries $21_3$, $22_3$, a selector $24_3$, and XOR circuits $25_3$ and $26_3$. In one or more embodiments, the delay circuitries $21_3$ and $22_3$ have delay times $D_A$ and $D_B$, respectively. In one or more embodiments, the XOR circuit $25_3$ is configured to generate a previous symbol state signal Weak_P(C–A) which has a logical value equal to the exclusive OR of the previous symbol single ended signals Prev(A–B) and Prev(B–C). In one or more embodiments, the XOR circuit $26_3$ is configured to generate a current symbol state signal Weak_C(C–A) which has a logical value equal to the exclusive OR of the current symbol single ended signals Crt(A–B) and Crt (B–C). In one or more embodiments, the selector $24_3$ is configured to select one of the inputs D0, D1, and D2 based on the previous symbol state signal Weak_P(C–A) and the current symbol state signal Weak_C(C–A) and output the single ended signal inputted to the selected input as the compensated single ended signal Comp(C–A).

In one or more embodiments, as illustrated in FIG. 10, the delay times of the delay compensation circuitries $13_1$, $13_2$, and $13_3$ are controlled based on the states of the voltages $V_A-V_B$, $V_B-V_C$, and $V_C-V_A$ in the reception of the current symbol as well as the states of the voltages $V_A-V_B$, $V_B-V_C$, and $V_C-V_A$ in the reception of the previous symbol.

In one or more embodiments, the delay time of the delay compensation circuitry $13_1$ is controlled based on whether the voltages $V_A-V_B$ in the reception of the previous symbol and the reception of the current symbol are "weak" or "strong." In one or more embodiments, the delay time of the delay compensation circuitry $13_1$ is set to $D_A$ when the voltages $V_A-V_B$ in the reception of the previous symbol and the reception of the current symbol are both "weak." In one or more embodiments, the previous symbol state signal Weak_P(A–B) and the current symbol state signal Weak_C(A–B) outputted from the XOR circuits $25_1$ and $26_1$ are both set to "1" when the voltages $V_A-V_B$ in the reception of the previous symbol and the reception of the current symbol are both "weak." In such an embodiment, the selector $24_1$ selects the input D1 and outputs the single ended signal inputted to the input D1 as the compensated single ended signal Comp(A–B). This results in that the delay time applied to the delayed single ended signal Dly(A–B) by the delay compensation circuitry $13_1$ is set to $D_A$.

In one or more embodiments, the delay time of the delay compensation circuitry $13_1$ is set to $D_A$ when the voltages $V_A-V_B$ in the reception of the previous symbol and the reception of the current symbol are both "strong." In one or more embodiments, the previous symbol state signal Weak_P(A–B) and the current symbol state signal Weak_C(A–B) outputted from the XOR circuits $25_1$ and $26_1$ are both set to "0" when the voltages $V_A-V_B$ in the reception of the previous symbol and the reception of the current symbol are both "strong." In such an embodiment, the selector $24_1$ selects the input D1 and outputs the single ended signal inputted to the input D1 as the compensated single ended signal Comp(A–B). This results in that the delay time applied to the delayed single ended signal Dly(A–B) by the delay compensation circuitry $13_1$ is set to $D_A$.

In one or more embodiments, the delay time of the delay compensation circuitry $13_1$ is set to 0 when the voltage $V_A-V_B$ in the reception of the previous symbol is "strong" and the voltage $V_A-V_B$ in the reception of the current symbol is "weak." In one or more embodiments, the previous symbol state signal Weak_P(A–B) and the current symbol state signal Weak_C(A–B) are set to "0" and "1", respectively, when the voltage $V_A-V_B$ in the reception of the previous symbol is "strong" and the voltage $V_A-V_B$ in the reception of the current symbol is "weak." In such an embodiment, the selector $24_1$ selects the input D0 and outputs the single ended signal inputted to the input D0 as the compensated single ended signal Comp(A–B). This results in that the delay time applied to the delayed single ended signal Dly(A–B) by the delay compensation circuitry $13_1$ is set to 0.

In one or more embodiments, the delay time of the delay compensation circuitry $13_1$ is set to $D_A+D_B$ when the voltage $V_A-V_B$ in the reception of the previous symbol is "weak" and the voltage $V_A-V_B$ in the reception of the current symbol is "strong." In one or more embodiments, the previous symbol state signal Weak_P(A–B) and the current symbol state signal Weak_C(A–B) are set to "1" and "0", respectively, when the voltage $V_A-V_B$ in the reception of the previous symbol is "weak" and the voltage $V_A-V_B$ in the reception of the current symbol is "strong." In such an embodiment, the selector $24_1$ selects the input D2 and outputs the single ended signal inputted to the input D2 as the compensated single ended signal Comp(A–B). This results in that the delay time applied to the delayed single ended signal Dly(A–B) by the delay compensation circuitry $13_1$ is set to $D_A+D_B$.

In one or more embodiments, these operations achieve generation of the compensated single ended signal Comp (A–B) so that the dispersion in the zero crossing timing of the voltage $V_A-V_B$ is further compensated. For example, when the time difference between the timing "Fast" and the timing "Mid" is the same as that between the timing "Mid" and the timing "Slow", setting the delay times $D_A$ and $D_B$ of the delay circuitries $21_1$ and $22_1$ to the time difference makes it possible to generate the compensated single ended signal Comp(A–B) so that there are only one type of effective zero crossing timing "Slow" with respect to the voltage $V_A-V_B$. Even if the time difference between the timings "Fast" and the timing "Mid" is not the same as that between the timing "Mid" and the timing "Slow", in one or more embodiments, the dispersion in the zero crossing timing of the voltage $V_A-V_B$ can be compensated by setting the delay times $D_A$ and $D_B$ to appropriate values, for example, the average of the time difference between the timings "Fast" and "Mid" and the time difference between the timings "Mid" and "Slow."

In one or more embodiments, the delay time of the delay compensation circuitry $13_2$ is controlled in a similar way. In one or more embodiments, the delay compensation circuitry $13_2$ is controlled based on whether the voltages $V_B-V_C$ in the reception of the previous and the reception of the current symbol are "weak" or "strong."

In one or more embodiments, when the voltages $V_B-V_C$ in the reception of the previous symbol and the reception of the current symbol are both "weak" or both "strong", the selector $24_2$ selects the input D1 and outputs the single ended signal inputted to the input D1 as the compensated single ended signal Comp(B–C). This results in that the delay time applied to the delayed single ended signal Dly(B–C) by the delay compensation circuitry $13_2$ is set to $D_A$.

In one or more embodiments, when the voltage $V_B-V_C$ in the reception of the previous symbol is "strong" and the voltage $V_B-V_C$ in the reception of the current symbol is "weak", the selector $24_2$ selects the input D0 and outputs the single ended signal inputted to the input D0 as the compensated single ended signal Comp(B–C). This results in that the delay time applied to the delayed single ended signal Dly(B–C) by the delay compensation circuitry $13_2$ is set to 0.

In one or more embodiments, when the voltage $V_B-V_C$ in the reception of the previous symbol is "weak" and the voltage $V_B-V_C$ in the reception of the current symbol is "strong", the selector $24_2$ selects the input D2 and outputs the single ended signal inputted to the input D2 as the compensated single ended signal Comp(B–C). This results in that the delay time applied to the delayed single ended signal Dly(B–C) by the delay compensation circuitry $13_2$ is set to $D_A+D_B$.

In one or more embodiments, the delay time of the delay compensation circuitry $13_3$ is controlled in a similar way. In one or more embodiments, the delay compensation circuitry $13_3$ is controlled based on whether the voltages $V_C-V_A$ in the reception of the previous symbol and the reception of the current symbol are "weak" or "strong."

In one or more embodiments, when the voltages $V_C-V_A$ in the reception of the previous symbol and the reception of the current symbol are both "weak" or "strong", the selector $24_3$ selects the input D1 and outputs the single ended signal inputted to the input D1 as the compensated single ended signal Comp(C–A). This results in that the delay time applied to the delayed single ended signal Dly(C–A) by the delay compensation circuitry $13_3$ is set to $D_A$.

In one or more embodiments, when the voltage $V_C-V_A$ in the reception of the previous symbol is "strong" and the voltage $V_C-V_A$ in the reception of the current symbol is "weak", the selector $24_3$ selects the input D0 and outputs the single ended signal inputted to the input D0 as the compensated single ended signal Comp(C–A). This results in that the delay time applied to the delayed single ended signal Dly(C–A) by the delay compensation circuitry $13_3$ is set to 0.

In one or more embodiments, when the voltage $V_C-V_A$ in the reception of the previous symbol is "weak" and the voltage $V_C-V_A$ in the reception of the current symbol is "strong", the selector $24_3$ selects the input D2 and outputs the single ended signal inputted to the input D2 as the compensated single ended signal Comp(C–A). This results in that the delay time applied to the delayed single ended signal Dly(C–A) by the delay compensation circuitry $13_3$ is set to $D_A+D_B$.

In one or more embodiments, the compensated single ended signals Comp(A–B), Comp(B–C), and Comp(C–A) are supplied to the clock recovery circuitry 16 from the delay compensation circuitries $13_1$, $13_2$, and $13_3$ through the above-described operations. In one or more embodiments, the clock recovery circuitry 16 generates the recovered clock signal RCLK based on the compensated single ended signals Comp(A–B), Comp(B–C), and Comp(C–A) outputted from the delay compensation circuitries $13_1$, $13_2$, and $13_3$. This operation effectively compensates the dispersion in the zero crossing timing of the voltages $V_A-V_B$, $V_B-V_C$, and $V_C-V_A$ in the generation of the recovered clock signal RCLK supplied to the latches $15_1$ to $15_3$.

As described above, in one or more embodiments, it is identified whether each of the voltages $V_A-V_B$, $V_B-V_C$, and $V_C-V_A$ are "weak" or "strong" in the reception of the current symbol as well as the reception of the previous symbol, and the delay times of the delay compensation circuitries $13_1$, $13_2$, and $13_3$ are controlled based on the identification result. In such embodiments, further compensation of the dispersion in the zero crossing timing in generation of the compensated single ended signals Comp(A–B), Comp(B–C), and Comp(C–A) may be achieved. In one or more embodiments, the receiver device 2 effectively enlarges the data valid window by generating the recovered clock signal RCLK based on the single ended signals Comp(A–B), Comp(B–C), and Comp(C–A) thus generated.

Figure 11:
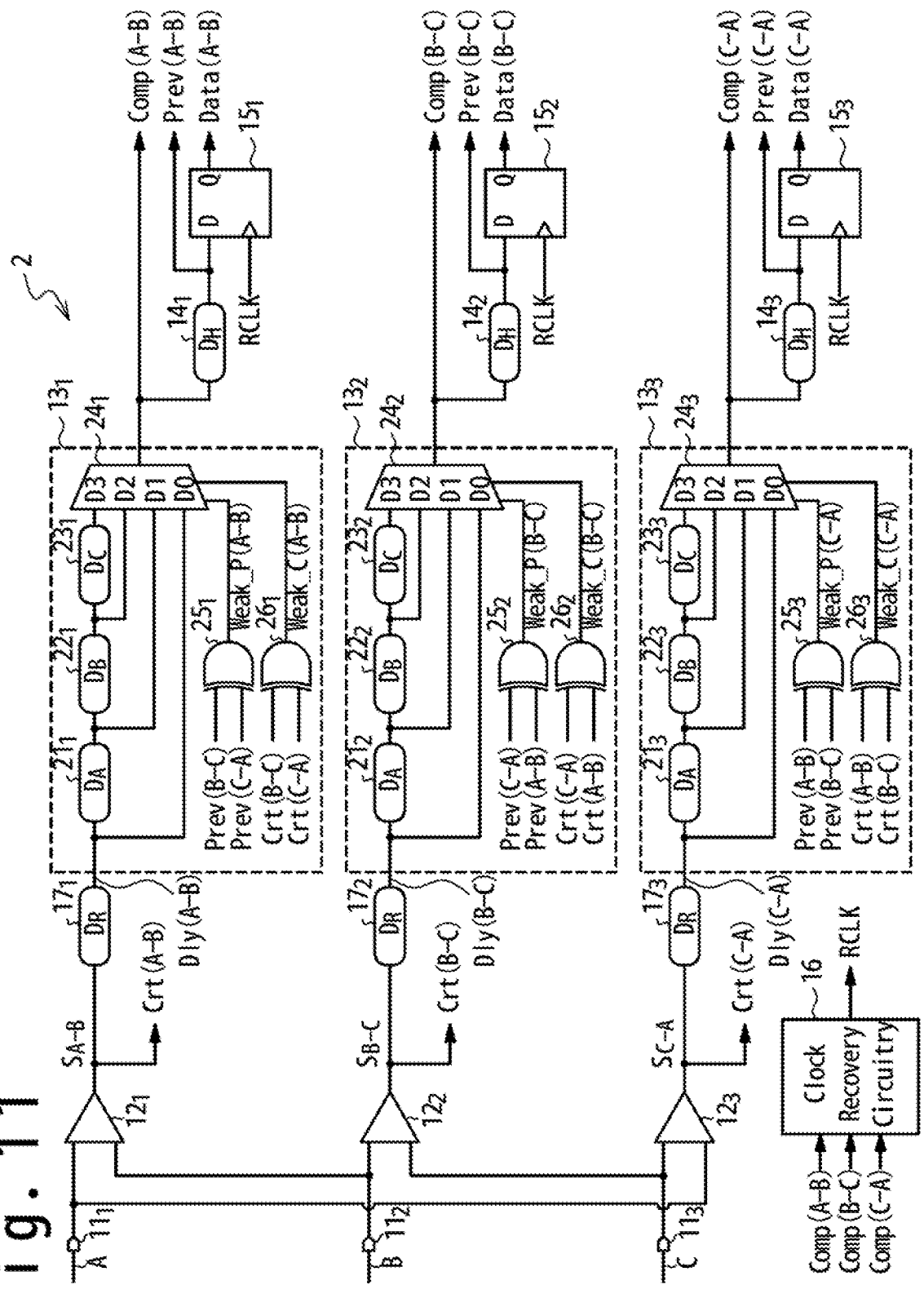
FIG. 11 illustrates an example configuration of a receiver device, according to one or more embodiments.

In one or more embodiments, as illustrated in FIG. 11, the configurations of the delay compensation circuitries $13_1$, $13_2$, and $13_3$ are modified. In one or more embodiments, the rest of the receiver device 2 illustrated in FIG. 11 is configured similarly to the receiver device 2 illustrated in FIG. 9.

In one or more embodiments, the delay compensation circuitry $13_1$ additionally comprises delay circuitry $23_1$ connected to the output of the delay circuitry $22_1$, the delay circuitry $23_1$ having a delay time $D_C$. In one or more embodiments, the selector $24_1$ comprises four inputs D0 to D3. In one or more embodiments, the input D0 of the selector $24_1$ is connected to the output of the delay circuitry $17_1$, the input D1 is connected to the output of the delay circuitry $21_1$, the input D2 is connected to the output of the delay circuitry $22_1$, and the input D3 is connected to the output of the delay circuitry $23_1$. In one or more embodiments, the delay compensation circuitry $13_1$ thus configured gives a selected one of delay times 0, $D_A$, $D_A+D_B$, $D_A+D_B+D_C$ to the delayed single ended signal Dly(A–B) outputted from the delay circuitry $17_1$.

In one or more embodiments, the delay compensation circuitries $13_2$ and $13_3$ are configured similarly. The delay compensation circuitry $13_2$ additionally comprises delay circuitry $23_2$ having the delay time $D_C$, and the delay compensation circuitry $13_3$ additionally comprises delay circuitry $23_3$ having the delay time $D_C$. In one or more embodiments, the selectors $24_2$ and $24_3$ both comprise four inputs D0 to D3. In one or more embodiments, the input D0 of the selector $24_2$ is connected to the output of the delay circuitry $17_2$, the input D1 is connected to the output of the delay circuitry $21_2$, the input D2 is connected to the output of the delay circuitry $22_2$, and the input D3 is connected to the output of the delay circuitry $23_2$. In one or more embodiments, the input D0 of the selector $24_3$ is connected to the output of the delay circuitry $17_3$, the input D1 is connected to the output of the delay circuitry $21_3$, the input D2 is connected to the output of the delay circuitry $22_3$, and the input D3 is connected to the output of the delay circuitry $23_3$. In one or more embodiments, the delay compensation circuitries $13_2$ and $13_3$ thus configured give a selected one of delay times 0, $D_A$, $D_A+D_B$, $D_A+D_B+D_C$ to the delayed single ended signals Dly(B–C) and Dly(C–A) outputted from the delay circuitries $17_2$ and $17_3$, respectively.

In one or more embodiments, the delay compensation circuitries $13_1$, $13_2$, and $13_3$ are configured to compensate variations in the delays of the differential receivers $12_1$ to $12_3$ depending on the potential differences of the input signals of the respective differential receivers $12_1$ to $12_3$, as well as the dispersion in the zero crossing timing. In one or more embodiments, as illustrated in FIG. 12, the delays of the differential receivers $12_1$ to $12_3$ vary depending on whether the voltages $V_A-V_B$, $V_B-V_C$, and $V_C-V_A$ are "weak" or "strong." In one or more embodiments, the compensation of the variations in the delays of the differential receivers $12_1$ to $12_3$ further enlarges the data valid window.

In one or more embodiments, the delays of the differential receivers $12_1$ to $12_3$ in reception of a current symbol may increase when the voltages $V_A-V_B$, $V_B-V_C$, and $V_C-V_A$ are "weak" in the reception of the current symbol, and decrease when "strong." Additionally, the delays of the differential receivers $12_1$ to $12_3$ may be influenced by the voltages $V_A-V_B$, $V_B-V_C$, and $V_C-V_A$ in reception of the previous symbol, although the influence of the previous symbol may be smaller than that of the current symbol. In one or more embodiments, the delays of the differential receivers $12_1$ to $12_3$ increase when the voltages $V_A-V_B$, $V_B-V_C$, and $V_C-V_A$ in reception of the previous symbol are "weak", and decrease when "strong".

In total, the delays of the differential receivers $12_1$ to $12_3$ are the largest when the voltages $V_A-V_B$, $V_B-V_C$, and $V_C-V_A$ are "weak" in the reception of the current symbol, in one or more embodiments. Such delays may be hereinafter referred to as "Large." The delays of the differential receivers $12_1$ to $12_3$ are the smallest when the voltages $V_A-V_B$, $V_B-V_C$, and $V_C-V_A$ are "strong" in both of the reception of the previous symbol and the reception of the current symbol, in one or more embodiments. Such delays may be hereinafter referred to as "Small." The delays of the differential receivers $12_1$ to $12_3$ are medium when the voltages $V_A-V_B$, $V_B-V_C$, and $V_C-V_A$ are "strong" in the reception of the current symbol and "weak" in the reception of the previous symbol, in one or more embodiments. Such delays may be hereinafter referred to as "Mid." In one or more embodiments, the receiver device 2 operates as described below to compensate the above-described variations in the delays of the differential receivers $12_1$ to $12_3$.

In one or more embodiments, as illustrated in FIG. 13, the delay times of the delay compensation circuitries $13_1$, $13_2$, and $13_3$ are controlled based on the voltages $V_A-V_B$, $V_B-V_C$, and $V_C-V_A$ in the reception of the previous symbol and the voltages $V_A-V_B$, $V_B-V_C$, and $V_C-V_A$ in the reception of the current symbol, as is the case with the operation illustrated in FIG. 10. In one or more embodiments, the delay times of the delay compensation circuitries $13_1$, $13_2$, and $13_3$ are selected from 0, $D_A$, $D_A+D_B$, and $D_A+D_B+D_C$, differently from the operation illustrated in the embodiment of FIG. 10.

In one or more embodiments, when the voltage $V_A-V_B$ is "strong" in the reception of the previous symbol and "weak" in the reception of the current symbol, the zero crossing timing of the voltage $V_A-V_B$ is "Slow", which is the latest timing, and the delay of the differential receiver $12_1$ is "Large", which is the largest delay." In such an embodiment, the delay time of the delay compensation circuitry $13_1$ is accordingly set to 0, which is the smallest delay. In one or more embodiments, the previous symbol state signal Weak_P(A–B) outputted from the XOR circuit $25_1$ is set to "0", and the current symbol state signal Weak_C(A–B) outputted from the XOR circuit $26_1$ is set to "1." In one or more embodiment, the selector $24_1$ accordingly selects the input D0 and outputs the single ended signal inputted to the input D0 as the compensated single ended signal Comp(A–B). This results in that the delay time applied to the delayed single ended signal Dly(A–B) by the delay compensation circuitry $13_1$ is set to 0.

In one or more embodiments, when the voltage $V_A-V_B$ is "weak" in both of the reception of the previous symbol and the reception of the current symbol, the zero crossing timing of the voltage $V_A-V_B$ is "Mid", and the delay of the differential receiver $12_1$ is "Large." In such an embodiment, the delay time of the delay compensation circuitry $13_1$ is accordingly set to $D_A$, which is the second smallest delay. In one or more embodiments, the previous symbol state signal Weak_P(A–B) and the current symbol state signal Weak_C(A–B), which are outputted from the XOR circuits $25_1$ and $26_1$, respectively, are both set to "1." In one or more embodiments, the selector $24_1$ accordingly selects the input D1 and outputs the single ended signal inputted to the input D1 as the compensated single ended signal Comp(A–B). This results in that the delay time applied to the delayed single ended signal Dly(A–B) by the delay compensation circuitry $13_1$ is set to $D_A$.

In one or more embodiments, when the voltage $V_A-V_B$ is "strong" in both of the reception of the previous symbol and the reception of the current symbol, the zero crossing timing of the voltage $V_A-V_B$ is "Mid", and the delay of the differential receiver $12_1$ is "Small", which is the smallest delay. In such an embodiment, the delay time of the delay compensation circuitry $13_1$ is accordingly set to $D_A+D_B$, which is the second largest delay. In one or more embodiments, the previous symbol state signal Weak_P(A–B) and the current symbol state signal Weak_C(A–B), which are outputted from the XOR circuits $25_1$ and $26_1$, respectively, are both set to "0." The selector $24_1$ selects the input D2 and outputs the single ended signal inputted to the input D2 as the compensated single ended signal Comp(A–B). This results in that the delay time applied to the delayed single ended signal Dly(A–B) by the delay compensation circuitry $13_1$ is set to $D_A+D_B$.

In one or more embodiments, when the voltage $V_A-V_B$ is "weak" in the reception of the previous symbol and "strong" in the reception of the current symbol, the zero crossing timing of the voltage $V_A-V_B$ is "Fast", which is the earliest timing, and the delay of the differential receiver $12_1$ is "Mid." In this case, the delay time of the delay compensation circuitry $13_1$ is set to $D_A+D_B+D_C$, which is the largest delay, in one or more embodiments. In one or more embodiments, the previous symbol state signal Weak_P(A–B) outputted from the XOR circuit $25_1$ is set to "1", and the current symbol state signal Weak_C(A–B) outputted from the XOR circuit $26_1$ is set to "0." In one or more embodiments, the selector $24_1$ accordingly selects the input D3 and outputs the single ended signal inputted to the input D3 as the compensated single ended signal Comp(A–B). This results in that the delay time applied to the delayed single ended signal Dly(A–B) by the delay compensation circuitry $13_1$ is set to $D_A+D_B+D_C$.

In one or more embodiments, the above-describe operation effectively compensates the dispersion in the zero crossing timing of the voltage $V_A-V_B$ and further compensates the variations in the delay time of the differential receiver $12_1$, in the generation of the compensated single ended signal Comp(A–B).

In one or more embodiments, the delay time of the delay compensation circuitry $13_2$ is controlled similarly. In one or more embodiments, when the voltage $V_B-V_C$ is "strong" in the reception of the previous symbol and "weak" in the reception of the current symbol, the selector $24_2$ of the delay compensation circuitry $13_2$ selects the input D0 and outputs the single ended signal inputted to the input D0 as the compensated single ended signal Comp(B–C). This results in that the delay time applied to the delayed single ended signal Dly(B–C) by the delay compensation circuitry $13_2$ is set to 0.

In one or more embodiments, when the voltage $V_B-V_C$ is "weak" in both of the reception of the previous symbol and the reception of the current symbol, the selector $24_2$ selects the input D1 and outputs the single ended signal inputted to the input D1 as the compensated single ended signal Comp(B–C). This results in that the delay time applied to the delayed single ended signal Dly(B–C) by the delay compensation circuitry $13_2$ is set to $D_A$.

In one or more embodiments, when the voltage $V_B-V_C$ is "strong" in both of the reception of the previous symbol and the reception of the current symbol, the selector $24_2$ selects the input D2 and outputs the single ended signal inputted to the input D2 as the compensated single ended signal Comp(B–C). This results in that the delay time applied to the delayed single ended signal Dly(B–C) by the delay compensation circuitry $13_2$ is set to $D_A+D_B$.

In one or more embodiments, when the voltage $V_B-V_C$ is "weak" in the reception of the previous symbol and "strong" in the reception of the current symbol, the selector $24_2$ selects the input D3 and outputs the single ended signal inputted to the input D3 as the compensated single ended signal Comp(B–C). This results in that the delay time applied to the delayed single ended signal Dly(B–C) by the delay compensation circuitry $13_2$ is set to $D_A+D_B+D_C$.

In one or more embodiments, the delay time of the delay compensation circuitry 133 is controlled similarly. In one or more embodiments, when the voltage VC–VA is "strong" in the reception of the previous symbol and "weak" in the reception of the current symbol, the selector 243 of the delay compensation circuitry 133 selects the input D0 and outputs the single ended signal inputted to the input D0 as the compensated single ended signal Comp(C–A). This results in that the delay time applied to the delayed single ended signal Dly(C–A) by the delay compensation circuitry 133 is set to 0.

In one or more embodiments, when the voltage VC–VA is "weak" in both of the reception of the previous symbol and the reception of the current symbol, the selector 243 selects the input D1 and outputs the single ended signal inputted to the input D1 as the compensated single ended signal Comp(C–A). This results in that the delay time applied to the delayed single ended signal Dly(C–A) by the delay compensation circuitry 133 is set to DA.

In one or more embodiments, when the voltage VC–VA is "strong" in both of the reception of the previous symbol and the reception of the current symbol, the selector 243 selects the input D2 and outputs the single ended signal inputted to the input D2 as the compensated single ended signal Comp(C–A). This results in that the delay time applied to the delayed single ended signal Dly(C–A) by the delay compensation circuitry 133 is set to DA+DB.

In one or more embodiments, when the voltage VC–VA is "weak" in the reception of the previous symbol and "strong" in the reception of the current symbol, the selector 243 selects the input D3 and outputs the single ended signal inputted to the input D3 as the compensated single ended signal Comp(C–A). This results in that the delay time applied to the delayed single ended signal Dly(C–A) by the delay compensation circuitry 133 is set to DA+DB+DC.

In one or more embodiments, the compensated single ended signals Comp(A–B), Comp(B–C), and Comp(C–A) are supplied to the clock recovery circuitry 16 from the delay compensation circuitries 131, 132, and 133 through the above-described operations. In one or more embodiments, the clock recovery circuitry 16 generates the recovered clock signal RCLK based on the compensated single ended signals Comp(A–B), Comp(B–C), and Comp(C–A) outputted from the delay compensation circuitries 131, 132, and 133.

As described above, in one or more embodiments, it is identified whether each of the voltages VA–VB, VB–VC, and VC–VA are "weak" or "strong" in the reception of the current symbol as well as the reception of the previous symbol, and the delay times of the delay compensation circuitries 131, 132, and 133 are selected from among 0, DA, DA+DB, DA+DB+DC, based on the identification result. This achieves compensation of the variations in the delays of the differential receivers 121, 122, and 123 as well as compensation of the dispersion in the zero crossing timing in the generation of the compensated single ended signals Comp(A–B), Comp(B–C), and Comp(C–A). In one or more embodiments, the receiver device 2 effectively enlarges the data valid window by generating the recovered clock signal RCLK based on the single ended signals Comp(A–B), Comp(B–C), and Comp(C–A) thus generated.

The delay times given by the delay compensation circuitries 131, 132, and 133 may be modified based on the properties of the differential receivers 121 to 123. In one or more embodiments, when the differential receivers 121 to 123 are configured so that the delays thereof decrease as the absolute values of the voltages VA–VB, VB–VC, and VC–VA decrease, the relationship between the voltages VA–VB, VB–VC, and VC–VA in reception of the previous and current symbols and the delay times given by the delay compensation circuitry 131, 132, and 133 may be modified from that illustrated in FIG. 13. In one or more embodiments, the delay times given by the delay compensation circuitry 131, 132, and 133 may be modified by modifying a truth table defining the operations of the selectors 241, 242, and 243, respectively.

Although various embodiments of the present disclosure have been specifically described, the technologies described herein may be implemented with various modifications. Although the above-described embodiments recite data communication systems supporting the MIPI C-PHY standard, in which data communications are performed over the three wires A, B, and C, each of which is allowed to take three potentials, the technologies described in the above-described embodiments may be used in a data communication system in which data communications are performed over four or more wires or in a data communication system in which each wire is allowed to take four or more potentials.

What is claimed is:

1. A receiver device, comprising:
a first differential receiver configured to output a first single ended signal based on a voltage between a first wire and a second wire of three or more wires;
first delay compensation circuitry configured to generate a first compensated single ended signal by delaying the first single ended signal;
clock recovery circuitry configured to generate a recovered clock signal at least partially based on the first compensated single ended signal; and
first latch circuitry configured to latch the first compensated single ended signal in synchronization with the recovered clock signal,
wherein a delay time of the first delay compensation circuitry used in reception of a first symbol is at least partially based on a voltage between the first wire and the second wire in reception of a second symbol transmitted before the first symbol.

2. The receiver device according to claim 1, wherein the delay time of the first delay compensation circuitry used in the reception of the first symbol is at least partially based on whether the voltage between the first wire and the second wire in the reception of the second symbol is in a first state or a second state, and
wherein an absolute value of the voltage between the first wire and second wire in the second state is smaller than an absolute value of the voltage between the first wire and the second wire in the first state.

3. The receiver device according to claim 1, further comprising:
a second differential receiver connected to the second wire and a third wire of the three or more wires and configured to output a second single ended signal; and
a third differential receiver connected to the third wire and the first wire and configured to output a third single ended signal, and
wherein the delay time of the first delay compensation circuitry is at least partially based on the second single ended signal and the third single ended signal.

4. The receiver device according to claim 1, wherein signals generated in accordance with a mobile industry processor interface (MIPI) C-PHY standard are supplied to the first wire and the second wire.

5. The receiver device according to claim 1, further comprising:
a second receiver configured to output a second single ended signal based on a voltage between the second wire and a third wire of the three or more wires;
a third receiver configured to output a third single ended signal based on a voltage between the third wire and the first wire;
second delay compensation circuitry configured to generate a second compensated single ended signal by delaying the second single ended signal; and third delay compensation circuitry configured to generate a third compensated single ended signal delaying the third single ended signal,
wherein a delay time of the second delay compensation circuitry used in the reception of the first symbol is at least partially based on a voltage between the second wire and the third wire in the reception of the second symbol, and
wherein a delay time of the third delay compensation circuitry used in the reception of the first symbol is at least based on a voltage between the third wire and the first wire in the reception of the second symbol.

6. The receiver device according to claim 5, further comprising:
first hold delay circuitry configured to generate a first previous symbol single ended signal by delaying the first compensated single ended signal;
second hold delay circuitry configured to generate a second previous symbol single ended signal by delaying the second compensated single ended signal; and
third hold delay circuitry configured to generate a third previous symbol single ended signal by delaying the third compensated single ended signal,
wherein the delay time of the first delay compensation circuitry is at least partially based on the second previous symbol single ended signal and the third previous symbol single ended signal.

7. The receiver device according to claim 6, wherein the delay time of the first delay compensation circuitry is at least partially based on an exclusive OR of the second previous symbol single ended signal and the third previous symbol single ended signal.

8. The receiver device, according to claim 6, wherein the delay time of the second delay compensation circuitry is at least partially based on the third previous symbol single ended signal and the first previous symbol single ended signal, and
wherein the delay time of the third delay compensation circuitry is at least partially based on the first previous symbol single ended signal and the second previous symbol single ended signal.

9. The receiver device according to claim 8, wherein the delay time of the second delay compensation circuitry is at least partially based on an exclusive OR of the third previous symbol single ended signal and the first previous symbol single ended signal, and
wherein the delay time of the third delay compensation circuitry is at least partially based on an exclusive OR of the first previous symbol single ended signal and the second previous symbol single ended signal.

10. The receiver device according to claim 5, wherein the delay time of the second delay compensation circuitry used in the reception of the first symbol is at least partially based on a voltage between the second wire and the third wire in the reception of the first symbol, and
wherein the delay time of the third delay compensation circuitry used in the reception of the first symbol is at least partially on a voltage between the third wire and the first wire in the reception of the first symbol.

11. The receiver device according to claim 10, further comprising:
first hold delay circuitry configured to generate a first previous symbol single ended signal by delaying the first compensated single ended signal;
second hold delay circuitry configured to generate a second previous symbol single ended signal by delaying the second compensated single ended signal; and third hold delay circuitry configured to generate a third previous symbol single ended signal by delaying the third compensated single ended signal, wherein the delay time of the first delay compensation circuitry is at least partially based on the second single ended signal, the third single ended signal, the second previous symbol single ended signal, and the third previous symbol single ended signal.

12. The receiver device according to claim 11, wherein the delay time of the first delay compensation circuitry is at least partially based on an exclusive OR of the second single ended signal and the third single ended signal, and an exclusive OR of the second previous symbol single ended signal and the third previous symbol single ended signal.

13. The receiver device according to claim 11, wherein the delay time of the first delay compensation circuitry is selected from among four delay times based on the second single ended signal, the third single ended signal, the second previous symbol single ended signal, and the third previous symbol single ended signal.

14. The receiver device according to claim 11, wherein the delay time of the second delay compensation circuitry is at least partially based on the third single ended signal, the first single ended signal, the third previous symbol single ended signal, and the first previous symbol single ended signal, and wherein the delay time of the third delay compensation circuitry is at least partially based on the first single ended signal, the second single ended signal, the first previous symbol single ended signal, and the second previous symbol single ended signal.

15. The receiver device according to claim 1, wherein the delay time of the first delay compensation circuitry used in the reception of the first symbol is further based on a voltage between the first wire and the second wire in the reception of the first symbol.

16. The receiver device according to claim 15, wherein the delay time of the first delay compensation circuitry used in the reception of the first symbol is at least partially based on whether the voltage between the first wire and the second wire in the reception of the first symbol and the voltage between the first wire and the second wire in the reception of the second symbol are in a first state or a second state, and wherein an absolute value of the voltage between the first wire and the second wire in the second state is smaller than an absolute value of the voltage between the first wire and the second wire in the first state.

17. A receiver device, comprising:
a first differential receiver configured to output a first single ended signal based on a voltage between a first wire and a second wire;
a second differential receiver configured to output a second single ended signal based on a voltage between the second wire and a third wire;
a third differential receiver configured to output a third single ended signal based on a voltage between the third wire and the first wire; and
first state identification circuitry configured to generate a first state signal indicating a state of a voltage between the first wire and the second wire based on the second single ended signal and the third single ended signal.

18. The receiver device according to claim 17, wherein the first state identification circuitry is further configured to generate the first state signal based on one of the second single ended signal and the third single ended signal.

19. The receiver device according to claim 17, further comprising:
second state identification circuitry configured to generate a second state signal indicating a state of a voltage between the second wire and the third wire based on the third single ended signal and the first single ended signal; and
third state identification circuitry configured to generate a third state signal indicating a state of a voltage between the third wire and the first wire based on the first single ended signal and the second single ended signal.

20. A data reception method, comprising:
outputting a first single ended signal based on a voltage between a first wire and a second wire;
generating a first compensated single ended signal by delaying the first single ended signal;
generating a recovered clock signal based on the first compensated single ended signal; and
latching the first compensated single ended signal in synchronization with the recovered clock signal,
wherein generating the first compensated single ended signal comprises controlling a delay time applied to the first single ended signal in generating the first compensated single ended signal in reception of a first symbol, based on a voltage between the first wire and the second wire in reception of a second symbol transmitted before the first symbol.

* * * * *